Nov. 21, 1950  D. B. BROWNLOW ET AL  2,530,420
VENETIAN BLIND TAPE CUTTING MACHINE
Filed Sept. 3, 1948  4 Sheets-Sheet 1

Inventors
David B. Brownlow
Joseph J. Markoski
by Seymour, Earle & Nichols
Attorneys Nov. 21, 1950 D. B. BROWNLOW ET AL 2,530,420
VENETIAN BLIND TAPE CUTTING MACHINE
Filed Sept. 3, 1948 4 Sheets-Sheet 2

Inventors
David B. Brownlow
Joseph J. Markoski
By Seymour, Easter Nichols
Attorneys

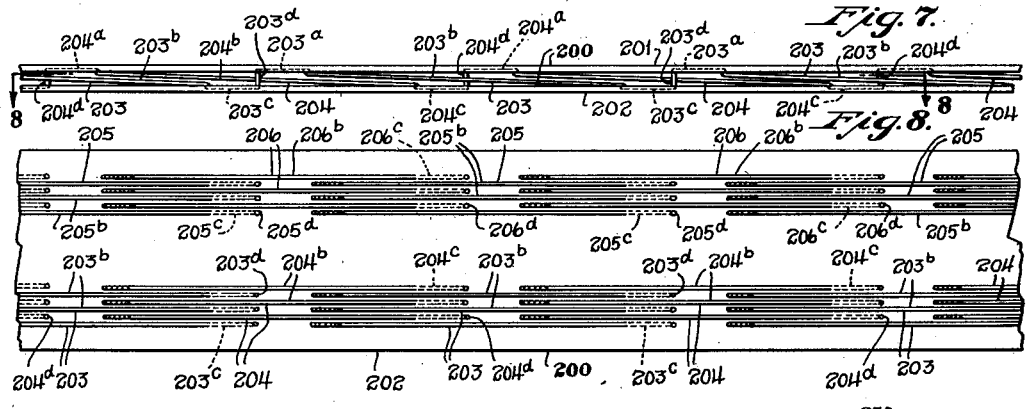

Nov. 21, 1950   D. B. BROWNLOW ET AL   2,530,420
VENETIAN BLIND TAPE CUTTING MACHINE
Filed Sept. 3, 1948   4 Sheets-Sheet 4
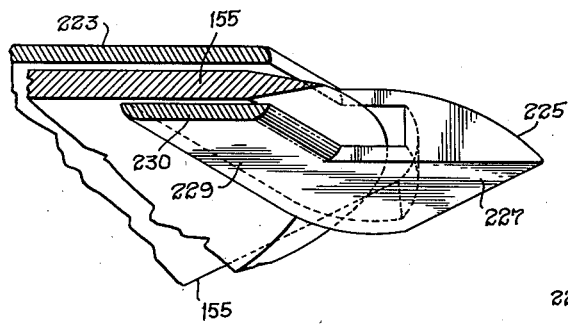
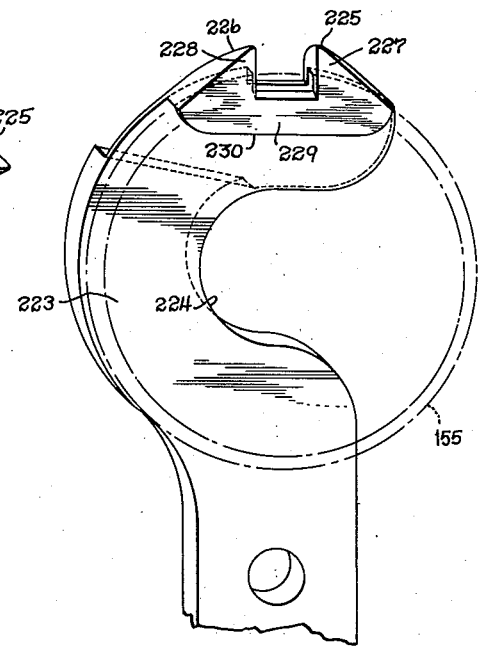
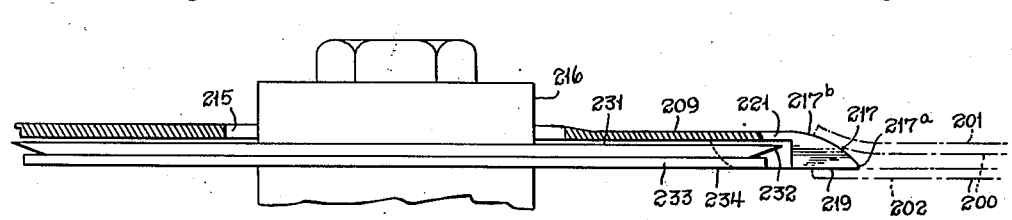
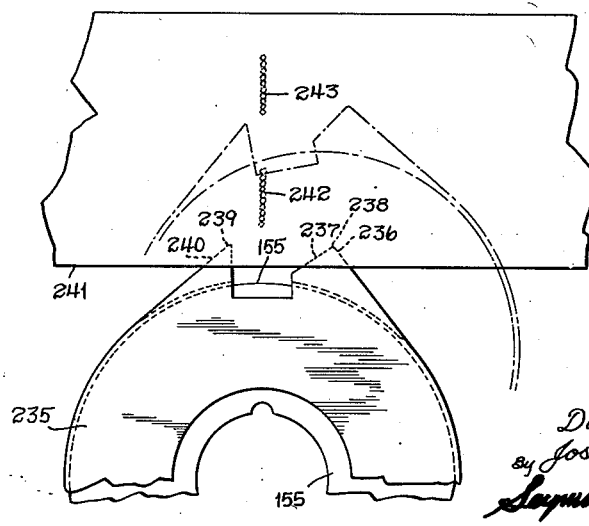
Inventors
David B. Brownlow
Joseph J. Markoski
By Seymour, Earle & Nichols
Attorneys Patented Nov. 21, 1950

2,530,420

UNITED STATES PATENT OFFICE 2,530,420

VENETIAN BLIND TAPE CUTTING MACHINE

David B. Brownlow and Joseph J. Markoski, Middletown, Conn., assignors to The Russell Manufacturing Company, Middletown, Conn., a corporation of Connecticut Application September 3, 1948, Serial No. 47,636

10 Claims. (Cl. 26—7)

1

This invention relates to improvements in textile-cutting machines or mechanism. More particularly, it relates to mechanism for cutting the floats of the cross-straps or ladders made in the course of weaving ladders in ladder-webbing for Venetian blinds, and more particularly for cutting the floats made in the course of weaving twin ladders or rungs or ladder-webbing of Venetian blinds in which each pair of twin ladders is aligned or nearly aligned in approximately right angles to the longitudinal axis of the ladder-webbing. The present invention is an improvement on the Patent No. 2,259,172, Murdock, October 14, 1941, and therefore the disclosure of said patent is relied on in the present description without specifically describing all the parts of said patent.

In the weaving of twin-ladder ladder tape of the type the present machine is intended to cut the floats of, in order to have the ladders arranged sufficiently close together to permit overlapping of the slats of the Venetian blinds, it is necessary to employ a plurality of steps of ladder-warps for weaving the ladders, with each set of ladder-warps crossing as floats from one main tape to the other at a location intermediate the length of and transversely through or between the ladder-warps of the other set of ladder-warps. The floats of such ladder webbing are comparatively short, being in the neighborhood of one-eighth of an inch (more or less) and it is necessary, as is well understood in the art, to sever the floats so that the ladder webbing can be opened up for its normal use in a Venetian blind. But inasmuch as the floats are short and pass through or between the ladder-warps of the other set of ladder-warps, it is difficult to cut the floats without, at the same time, cutting one or more of the other set of ladder-warps that the floats extend through.

One object of this invention, therefore, is to provide an improved float-cutting mechanism which is adapted to automatically sever the floats which extend between or past the other set of ladder-warps, as above described, without severing any of such other set of ladder-warps.

With the above and other objects in view, as will appear to those skilled in the art from the present disclosure, this invention includes all features in the said disclosure which are novel over the prior art.

In the description and claims, the various parts and steps are identified by specific terms for convenience, but they are intended to be as generic in their application as the prior art will permit.

In the accompanying drawings forming part of the present disclosure, in which certain ways of carrying out the invention are shown for illustrative purposes:

Fig. 7 is a full-scale side or edge elevation of a fragment of twin-ladder ladder webbing to be cut by the machine of the present invention;

Fig. 8 is a horizontal sectional view, partly schematic, on line 8—8 of Fig. 7;

Fig. 9 is a full-scale top perspective view of a ladder-displacing member or guide-finger made in accordance with the present invention;

Fig. 10 is an underside perspective view of the ladder-displacing member shown in Fig. 9;

Fig. 11 is a one-and-one-half-size scale underside perspective view similar to Fig. 10, of a modified form of ladder-displacing member with a cutter shown in broken lines;

Fig. 12 is an enlarged underside perspective view of a front-end fragment of the ladder-displacing member shown in Fig. 11;

Fig. 13 is an enlarged view similar to Fig. 3, of another modified construction;

Fig. 14 is a one-and-one-half-size scale top plan view of another modified form of ladder-displacing member shown in cutting relation with a piece of twin-ladder ladder webbing;

Fig. 15 is a top plan view of another modified form of ladder-displacing member with a cutter and hub shown in broken lines; and Fig. 16 is a view similar to Fig. 5, illustrating the ladder-displacing member shown in Fig. 15 in relation to the cutter and hub.

Figure 1:
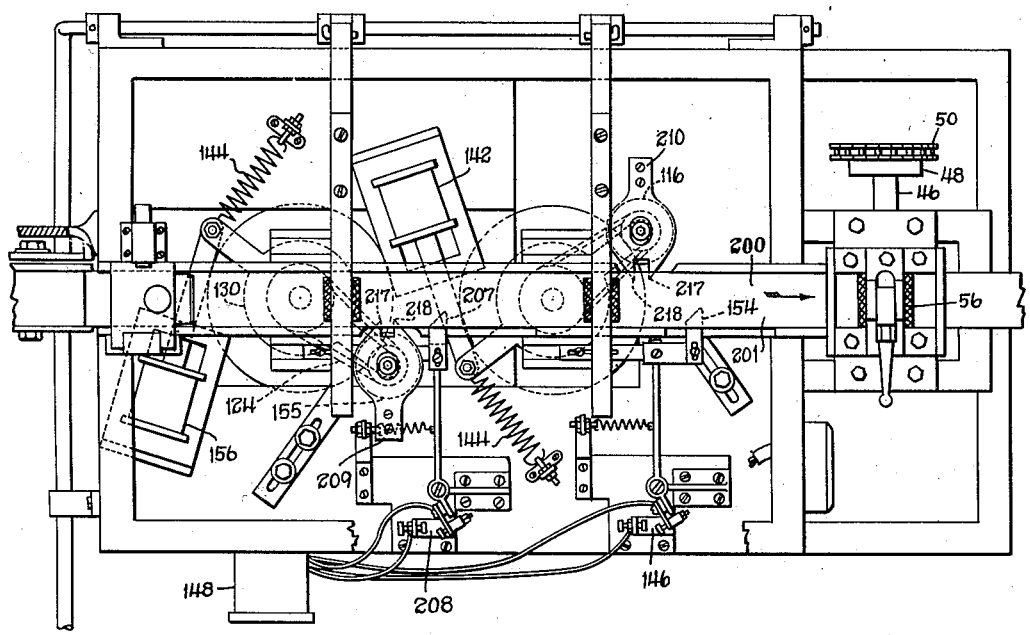
Fig. 1 is a top plan view of Fig. 8 of Patent No. 2,259,172, with such added and changed features as are involved in the present improvements upon the said patent.
Figure 2:
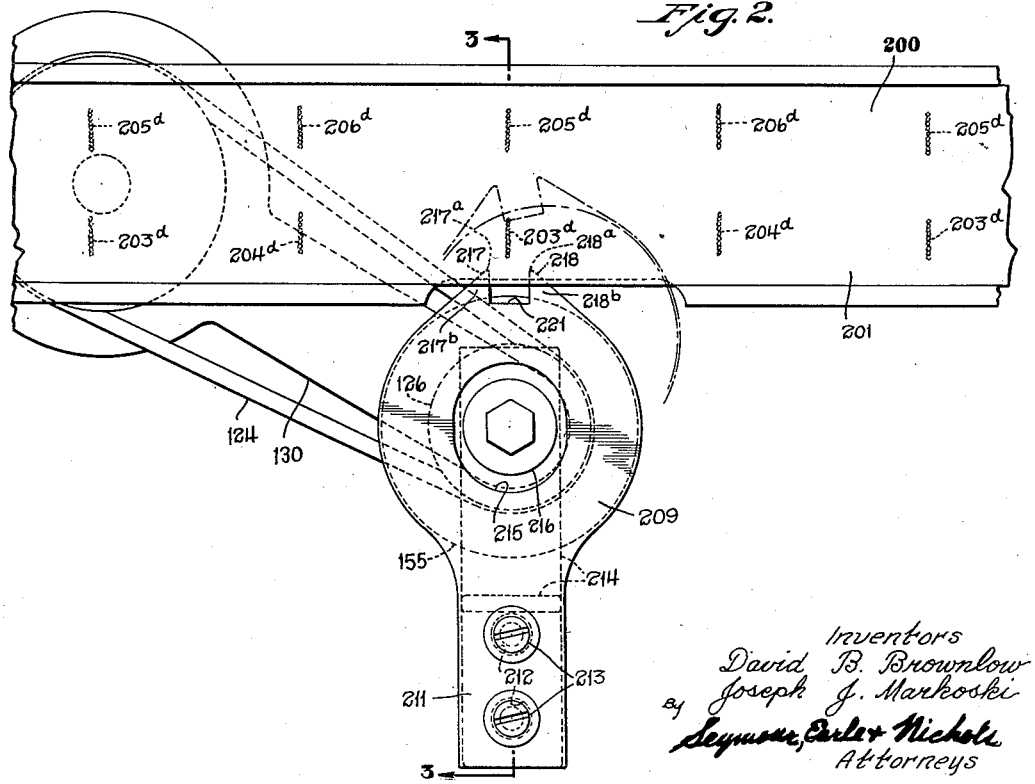
Fig. 2 is a full-scale top plan view of a portion of Fig. 1 illustrating the mode of action in cutting the floats of ladder tape.
Figure 3:
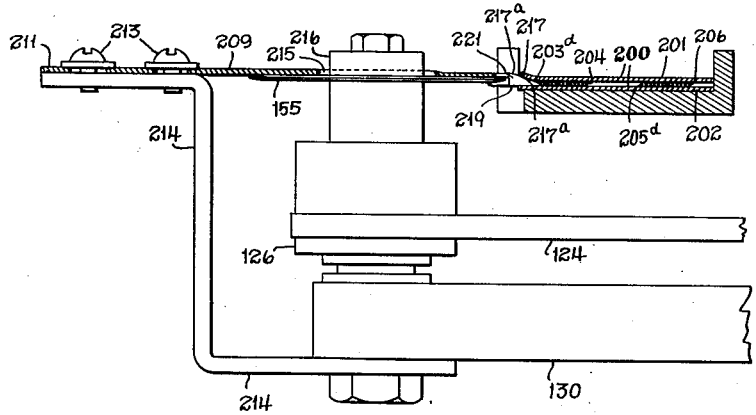
Fig. 3 is a full-scale vertical sectional view on line 3—3 of Fig. 2.
Figure 4:
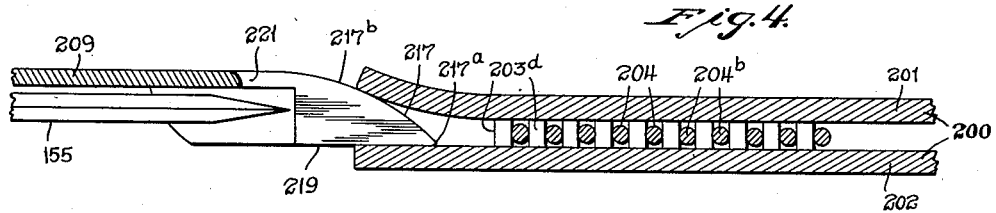
Fig. 4 is an enlarged fragmental sectional view of a portion of Fig. 3 just prior to the float-cutting operation.
Figure 5:
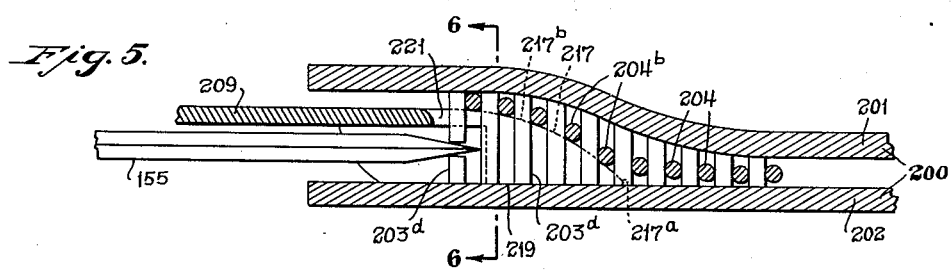
Fig. 5 is a view similar to Fig. 4 but at a time after the first float-thread has been cut.
Figure 6:
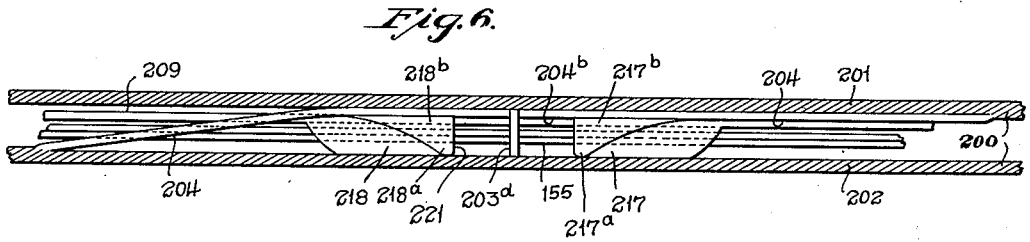
Fig. 6 is a vertical sectional view on line 6—6 of Fig. 5.

In the following description, numerals below 200 which are given to parts of the device in the present application, respectively correspond to parts given the same numbers in Patent No. 2,259,172, and numerals from 200 up used in the present application, refer to new parts added to the said patent, or to modified parts.

Referring to the form of the invention illustrated in Figs. 1 to 10 inclusive of the drawings, the twin-ladder ladder webbing or tape 200 (Figs. 1, 2, 7 and 8) has an upper main tape 201 and a lower main tape 202. One group or set of ladder-warp strands 203 along one side of the ladder webbing 200, is woven into the upper main tape 201 at the weave-in area 203a, then crosses over to the lower main tape 202 to thus form a multi-strand or cable ladder 203b, then is woven into the main tape 202 at the weave-in area 203c, then crosses back over to the first main tape 201 to form the comparatively-short float or set or group of floats 203d, and so on. And a second set of ladder-warp strands 204 along the same side of the tape forms a woven-in section or area 204a in the upper main tape 201, then crosses over to the other main tape 202 to form a multiple strand or cable ladder 204b, then is woven into the main tape 202 at the weave-in area 204c, then crosses back as the short float or set or group of floats 204d to the first main tape where it is again woven-in as a weave-in section 204a, and so on. Fig. 8 is an the same scale as Fig. 7, but the showing of the sets of ladder-warps is purely schematic, only three warps of each set along each side of the tape being illustrated, instead of the actual ten warps in the sample of tape illustrated in other figures of the drawings. The showing of only three warps is made for the reason that the warps actually are very fine and very closely adjacent one another, in fact, in side-by-side contact where they overlap, and, therefore, in order to illustrate the two sets of warps sufficiently clearly to be understood, they are actually shown of exaggeratedly large size and spaced transversely from one another to make their overlapping relationship more readily understood. Thus it will be seen that by looking at Fig. 8, the set of warps 203 occupies one continuous longitudinally-aligned position throughout their length, while the set of warps 204 occupy a transversely slightly-offset position which is maintained throughout the longitudinal length of the set of warp-strands 204. This transverse relationship of the two sets of warps is shown greatly exaggerated in the schematic showing of Fig. 8.

In similar manner, two sets of ladder-warp strands 205 and 206 extend along the other side of the ladder tape (see Fig. 8), each respectively having corresponding woven-in areas, ladders and floats, respectively in substantial transverse alignment with corresponding parts previously described for the two sets of ladder-warp strands 203 and 204 previously described. Thus, the parts 205a, 205b, 205c, 205d, 206a, 206b, 206c and 206d, respectively correspond to parts 203a, 203b, 203c, 203d, 204a, 204b, 204c and 204d.

While the two main tapes 201 and 202 are shown in Fig. 7 as spaced apart about one-eighth of an inch, actually, when woven, they lie in most portions against or very closely adjacent one another, or against the ladders with the ladders in contact with the two main tapes. Therefore, when it is desired to cut the floats 203d, 204d, 205d and 206d, it will be observed from Figs. 7 and 8, that since each float (actually, set of floats) as, for example, 203d, of the set of ladder-warps 203 extends transversely between or past the strands of the ladder 204b of the set of ladder-warps 204, that the ladders are normally in a position which interferes seriously with cutting the floats without at the same time cutting one or more of the ladder-warps.

Therefore, the present invention is primarily directed toward a mechanism or machine which will successfully and automatically cut the floats without cutting the ladder-warps adjacent the floats.

Referring to Fig. 1, the ladder webbing or tape 200 is fed to the right in the direction of the arrow, by means of feed-mechanism including parts 46, 48, 50 and 56, as more fully described in Patent No. 2,259,172. The rotary cutter 116 is mounted to be swung inwardly to float-cutting position by means of a solenoid 142 and to be retracted back to non-cutting position after the solenoid ceases to act, by the coil-spring 144. And similarly the rotary cutter 155 is adapted to be swung to its float-thread cutting position by means of the solenoid 156, and retracted to its original non-cutting position by the other spring 144. While both cutters could be caused to swing to their cutting positions by both solenoids being actuated by the single feeler or switch-operating finger 154 actuating the single electrical switch 146, nevertheless for greater accuracy in control of the cutting operation of the cutter 155, a second feeler or switch-actuating finger 207 similar to the finger 154, is provided to actuate a second switch 208 for energizing the solenoid 156 connected to the cutter 155. The current from the two switches 146 and 208 passes through a voltage-regulator 148 which can be adjusted to adjust the effective voltage on the solenoids 142 and 156, for controlling their speed of operation and, consequently, the speed of movement of the respective cutters to the end of their cutting position.

In order to lift or displace the cable or strand ladders which extend between and past a float (set of floats), adjacent both sides of the float, so that the float can be properly cut with a rotary cutter without endangering the severing of any of the strands of the ladders, we provide a ladder-displacing member or guide-finger 209 for the cutter 155 and a similar ladder-displacing member 210 for the cutter 116. As the mode of mounting and operation of both of these ladder-displacing members is essentially the same, the description of only one of them, namely, 209, will be described specifically.

Ladder-displacer means 209 can be in the form of a plate having a rear tang-portion 211 provided with holes 212 by which the member 209 can be secured by screws 213 (Fig. 3) to a bracket-arm 214 which in turn is firmly secured to the swinging arm 130 which carries the driven pulley 126 driven by the belt 124. The member 209 has a clearance-hole 215 through it, of any suitable shape. The clearance-hole 215 freely surrounds clamping-washer 216 so as to permit the member 209 to be clamped by the screws 213 in any necessary longitudinal or angular position of adjustment. The member 209 has a pair of spaced-apart cam-fingers 217 and 218 having under-surfaces respectively 219 and 220 which may be termed "presser-faces" or holding-faces, both of which faces lie in the same plane. Between the cam-fingers 217 and 218 is a clearance-slot 221 into which the forward edge-portion of the cutter 155 extends and into which the float 203d can enter (Fig. 2), so as to cut the float 203d when the cutter 155 with the ladder-displacing member 209 swings from the solid-line, non-cutting position (Fig. 2) to the broken-line or cutting position. The terms "float" or "a float" are commonly used in the art to mean a group or set of floats such, for example, as the group of ten float-strands in each of the several positions illustrated on the tape 200 in Fig. 2.

In order to not unduly stretch the floats, the cam-fingers 217, 218 are made thin; in the present instance, in the device actually employed in use, each finger has a total thickness of about $\frac{3}{32}$ of an inch, which permits the cam-fingers to lift the ladder-warps up against the upper main tape 201 and straighten out the floats properly to permit of proper cutting of the same, without undue stretching or pulling of the floats.

As the ladder-displacing member 209 moves to the right toward cutting position, the presser-faces or holding-faces 219, 220 slide along the upper or inner face of the lower main tape 202, the front-end points or edges 217a, 218a of the cam-fingers 217, 218 slide under the portions of the ladders on opposite sides of the float to be cut, and the cam-surfaces 217b, 218b of the cam-fingers 217, 218 cause the upper main tape 201 to be lifted and strands of the ladder portions at opposite sides of the float to be successively lifted up against the under-surface of the upper main tape 201 out of the way of the cutter 155, in advance of the start of the cutting action of the cutter on the float, so that prior to the cutting of any given float-strand of the float, the ladder-strand portions adjacent such float have been lifted out of possible engagement with the cutter. The presser- or holding-faces 219, 220 hold the lower main tape 202 from being lifted up toward the cutter, thus aiding in cutting the float-threads near their middle instead of near their juncture with the upper surface of the lower main tape.

As this forward cutting movement of the cutter 155 progresses, the cutter 155 severs one float-strand after another until the entire float (group of floats) is severed, whereupon the cutter 155 with its parts are swung back to its original non-cutting position. This movement forward through the cutting-stroke and back to its non-cutting rest position occurs very quickly by the action of the solenoid 156, as previously described. In the meantime, the ladder webbing 200 has been fed along continuously without any interruptions, the cutting action occurring during the very quick movement of the cutter in and out without interrupting the feed of the ladder webbing 200.

Figs. 11 and 12 show a modified form of ladder-displacing member 223 having a side clearance-slot 224. The rear or tang-portion of this member can be essentially the same as was shown and described for the member 209, except that it will preferably be thicker for greater stiffness of the major length of the member 223. The member 223 has a pair of cam-fingers 225 and 226 respectively having presser-faces 227 and 228 in a common plane with a presser-face 229 of a bridge-member 230 which extends across and interconnects the lower portions of the two cam-fingers 225 and 226. The three presser-faces 227, 228 and 229 being in one plane, form, in effect, a single generally U-shape presser- or holding-face which holds the portion of the lower main tape 202 thereunder, from being lifted up toward the cutter, for a similar purpose to that explained concerning the presser-faces 219, 220 of the member 209 of Figs. 1 to 10. The operative positions of the cutter 155 and the cutter-hub are shown in broken-line outline in Fig. 11, and a fragmental portion of the cutter 155 is shown in full lines in Fig. 12. The clearance-slot 224 permits of stoning the edge of the cutter 155 to resharpen it, without loosening or removing the member 223, thus saving time in sharpening and avoiding difficulty in replacing the member in the exact original position.

In the modified form of the invention illustrated in Fig. 13, the ladder-displacing member 209 is shown in assembled relation with a different form of cutter-member 231 which has a single beveled edge 232 instead of the double beveled edge heretofore illustrated, thus permitting this single beveled cutter bringing about the severing action at a higher position above the lower main tape 202. A washer-member 233 extends outwardly to a diameter which falls a little short of the cutting-edge of the cutter 231, to thus provide an underneath presser-face 234 which is in the same plane as the presser-faces 219 and 220 of the ladder-displacing member 209. This washer-member 233 is clamped in place with the rotating-cutter 231, so that both rotate together, the presser-face 234 constituting a rotating presser-face which performs a similar function to the presser-face 229 of the bridge 230 (Figs. 11 and 12). With the exception of parts 231 to 234, the parts illustrated in Fig. 13 are substantially the same as illustrated in preceding figures and bear like reference characters.

In the form of the invention illustrated in Fig. 14, a modified form of ladder-displacing member 235 is shown in which the outer-end portion of its right cam-finger 236 is sloped to the right at 237, to thus bring its outer end 238 at a greater distance away from the end 239 of the cam-finger 240. In the case of a ladder-tape 241, the adjacent ends of the floats 242 and 243 are especially close together as, for example, is illustrated in Fig. 14, so that the continuously-traveling ladder-tape 241 would cause the inner portion of the float 243 to engage the end 238 of the cam-finger 236, unless a greater interval of time is allowed before this contact can take place. This greater distance away of the end 238 permits the normally-quick movement of the ladder-displacing member 235 and the cutter 155 to the completion of its cutting position and back a substantial distance toward its neutral or non-cutting position, to thus remove the end 238 from possible contact with the float 243 before the latter can move to contact position with the end 238.

In the modified form of the invention illustrated in Figs. 15 and 16, the ladder-displacing member 244 has the major portion of its length thicker than the member 209, and it has a side clearance-slot 245. The front end portion has a pair of cam-fingers 246, 247, the respective top faces of which form presser-faces 248, 249, both of which lie in the same plane, and a clearance-slot 250. The cam-finger portion of the member 244 is similar to the corresponding portion of the member 209 of Fig. 9, but in use, the member 244 may be said to be upside down, for the purpose of pressing the ladder-warps of the ladder tape 200 down away from the upper main tape 201 (Fig. 16) in the direction which is aided by gravity, instead of upward away from the lower main tape 202 as in the case of the previous forms of ladder-displacing members. The float and ladders illustrated in Fig. 16, bear like reference characters to corresponding parts illustrated in Figs. 7 and 8. The clearance-slot 245 permits of stoning the cutter 155 without removing the member 244, and when for any reason it is desired to remove the member 244, this can be done without removing the cutter.

The invention may be carried out in other specific ways than those herein set forth without departing from the spirit and essential characteristics of the invention, and the present embodiments are, therefore, to be considered in all re- 2,530,420

We claim:

1. Mechanism for cutting the floats of ladder webbing which has two co-extending main tapes with ladders between and interconnecting the main tapes and with each float located intermediate the length of and substantially in longitudinal alignment with and extending transversely of a ladder, comprising: feed-means adapted to feed said ladder webbing longitudinally; cutter-means adapted to periodically relatively move toward a float and cut it, and away from such float; and ladder-displacing means adapted to periodically relatively displace a portion of a ladder adjacent a float to be cut, away from one main tape and transversely of the plane of, and toward the other main tape to a position out of the path-of-cut of said cutter-means, in advance of the cutting of such float.

2. Mechanism for cutting the floats of ladder webbing which has two co-extending main tapes with ladders between and interconnecting the main tapes and with each float located intermediate the length of and substantially in longitudinal alignment with and extending transversely of a ladder, comprising: feed-means adapted to feed said ladder webbing longitudinally; cutter-means adapted to periodically relatively move toward a float and cut it, and away from such float; and ladder-displacing means in advance of said cutter-means and adapted to periodically relatively displace a portion of a ladder adjacent a float to be cut, away from one main tape and transversely of the plane of and toward the other main tape to a position out of the path-of-cut of said cutter-means, in advance of the cutting of such float.

3. Mechansim for cutting the floats of ladder webbing which has two co-extending main tapes with ladders between and interconnecting the main tapes and with each float located intermediate the length of and substantially in longitudinal alignment with and extending transversely of a ladder, comprising: feed-means adapted to feed said ladder webbing longitudinally; cutter-means adapted to periodically relatively move toward a float and cut it, and away from such float; and ladder-displacing means having cam-means extending across the plane of and in advance of the cutting edge of said cutter-means to a location adjacent one main tape and adapted to periodically relatively displace a portion of a ladder adjacent a float to be cut, away from said one main tape and transversely of the plane of, and toward the other main tape to a position out of the path-of-cut of said cutter-means, in advance of the cutting of such float.

4. Mechanism for cutting the floats of ladder webbing which has two co-extending main tapes with ladders between and interconnecting the main tapes and with each float located intermediate the length of and substantially in longitudinal alignment with and extending transversely of a ladder, comprising: feed-means adapted to feed said ladder webbing longitudinally; cutter-means adapted to periodically relatively move toward a float and cut it, and away from such float; and ladder-displacing means having cam-means extending across the plane of and in advance of the cutting edge of said cutter-means to a location adjacent one main tape and movable with said cutter-means in the latter's movement to and from its cutting position, and adapted to periodically relatively displace a portion of a ladder adjacent a float to be cut, away from said one main tape toward the other main tape to a position out of the path-of-cut of said cutter-means, in advance of the cutting of such float.

5. Mechanism for cutting the floats of ladder webbing which has two co-extending main tapes with ladders between and interconnecting the main tapes and with each float located intermediate the length of and substantially in longitudinal alignment with and extending transversely of a ladder, comprising: feed-means adapted to feed said ladder webbing longitudinally; cutter-means adapted to periodically relatively move toward a float and cut it, and away from such float; and ladder-displacing means having spaced-apart cam-fingers extending across the plane of and in advance of the cutting edge of said cutter-means to a location adjacent one main tape and on opposite sides of the plane of a float to be cut and movable with said cutter-means in the latter's movement to and from its cutting position, and said fingers being adapted to periodically relatively displace portions of a ladder adjacent opposite sides of float to be cut, away from said one main tape toward the other main tape to a position out of the path-of-cut of said cutter-means, in advance of the cutting of such float.

6. Mechanism for cutting the floats of ladder webbing which has two co-extending main tapes with ladders between and interconnecting the main tapes and with each float located intermediate the length of and substantially in longitudinal alignment with and extending transversely of a ladder, comprising: feed-means adapted to feed said ladder webbing longitudinally; cutter-means adapted to periodically relatively move toward a float and cut it, and away from such float; and ladder-displacing means including a plate having spaced-apart cam-fingers extending across the plane of and in advance of the cutting edge of said cutter-means to a location adjacent one main tape and on opposite sides of the plane of a float to be cut and said ladder-displacing means being movable with said cutter-means in the latter's movement to and away from its cutting position, and said fingers being adapted to periodically relatively displace portions of a ladder adjacent opposite sides of a float to be cut, away from said one main tape toward the other main tape to a position out of the path-of-cut of said cutter-means, in advance of the cutting of such float.

7. Mechanism for cutting the floats of ladder webbing which has two co-extending main tapes with ladders between and interconnecting the main tapes and with each float located intermediate the length of and substantially in longitudinal alignment with and extending transversely of a ladder, comprising: feed-means adapted to feed said ladder webbing longitudinally; cutter-means adapted to periodically relatively move toward a float and cut it, and away from such float; ladder-displacing means adapted to periodically relatively displace a portion of a ladder adjacent a float to be cut, away from one main tape toward the other main tape to a position out of the path-of-cut of said cutter-means, in advance of the cutting of such float; and presser-means at one side of said cutter-means, and adapted to engage against an inside face-portion of said one main tape and hold it from movement toward said other main tape.

8. Mechanism for cutting the floats of ladder webbing which has two co-extending main tapes with ladders between and interconnecting the main tapes and with each float located intermediate the length of and substantially in longitudinal alignment with and extending transversely of a ladder, comprising: feed-means adapted to feed said ladder webbing longitudinally; cutter-means adapted to periodically relatively move toward a float and cut it, and away from such float; ladder-displacing means having cam-means extending across the plane of and in advance of the cutting edge of said cutter-means to a location adjacent one main tape and adapted to periodically relatively displace a portion of a ladder adjacent a float to be cut, away from said one main tape toward the other main tape to a position out of the path-of-cut of said cutter-means, in advance of the cutting of such float; and presser-means carried by said cam-means and located at one side of said cutter-means, and adapted to engage against an inside face-portion of said one main tape and hold it from movement toward said other main tape.

9. Mechanism for cutting the floats of ladder webbing which has two co-extending main tapes with ladders between and interconnecting the main tapes and with each float located intermediate the length of and substantially in longitudinal alignment with and extending transversely of a ladder, comprising: feed-means adapted to feed said ladder webbing longitudinally; cutter-means adapted to periodically relatively move toward a float and cut it, and away from such float; ladder-displacing means including a plate having spaced-apart cam-fingers extending across the plane of and in advance of the cutting edge of said cutter-means to a location adjacent one main tape and on opposite sides of the plane of a float to be cut and said ladder-displacing means being movable with said cutter-means in the latter's movement to and from its cutting position, and said fingers being adapted to periodically relatively displace portions of a ladder adjacent opposite sides of a float to be cut, away from said one main tape toward the other main tape to a position out of the path-of-cut of said cutter-means, in advance of the cutting of such float; and a bridge-member interconnecting said cam-fingers and located at one side of said cutter-means, and the face of said bridge-member and cam-fingers most distant from said cutter-means, forming presser-means adapted to engage against an inside face-portion of said one main tape and hold it from movement toward said other main tape.

10. Mechanism for cutting the floats of ladder webbing which has two co-extending main tapes with ladders between and interconnecting the main tapes and with each float located intermediate the length of and substantially in longitudinal alignment with and extending transversely of a ladder, comprising: feed-means adapted to feed said ladder webbing longitudinally; rotary cutter-means adapted to periodically relatively move toward a float and cut it, and away from such float; ladder-displacing means adapted to periodically relatively displace a portion of a ladder adjacent a float to be cut, away from one main tape toward the other main tape to a position out of the path-of-cut of said cutter-means, in advance of the cutting of such float; and presser-means at one side of and rotatable with said rotary cutter-means, and adapted to engage against an inside face-portion of said one main tape and hold it from movement toward said other main tape.

DAVID B. BROWNLOW.
JOSEPH J. MARKOSKI.

REFERENCES CITED

The following references are of record in the file of this patent:

UNITED STATES PATENTS

| Number | Name | Date |
| --- | --- | --- |
| 2,080,831 | Oehrle | May 18, 1937 |
| 2,347,603 | Lucia | Apr. 25, 1944 |